Sept. 20, 1971  J. E. PARKER ET AL  3,605,442

JEWELRY MOUNTING HAVING COMBINED CUSHION AND SEALING MEANS

Filed May 26, 1969

INVENTORS
JAMES E. PARKER,
JOHN S. TITUS, JR.

BY John J. Held, Jr.
ATTORNEY

United States Patent Office 3,605,442
Patented Sept. 20, 1971

3,605,442
JEWELRY MOUNTING HAVING COMBINED CUSHION AND SEALING MEANS
James E. Parker and John S. Titus, Jr., Owatonna, Minn., assignors to Jostens, Inc., Owatonna, Minn.
Filed May 26, 1969, Ser. No. 827,776
Int. Cl. A44c 9/00
U.S. Cl. 63—15                                    7 Claims

ABSTRACT OF THE DISCLOSURE

An improved ring having a novel plastic cushion positioned in and extending completely around the ring bezel. The ring stone rests on and is supported in the bezel by an inwardly tapered seating surface formed on the plastic cushion so as to provide a relatively shock resistant setting for the ring stone. The surface of the plastic cushion is constructed and arranged so as to form a liquid seal between the ring stone and the plastic cushion and between the cushion and the bezel.

BACKGROUND OF THE INVENTION

This invention relates to an improved ring, and more particularly to an improved ring in which the ring stone is cushioned and sealed in the bezel in a novel and improved manner.

In the past, the ring stone has usually been mounted in the bezel so that it rests directly on the metal stone seat of the ring bezel. Stone breakage has occurred as a result of this metal-to-stone contact from the bumps and impacts to which the ring is subjected both during production of the ring and while the ring is being worn.

In connection with rings having "open back" construction, it has been proposed, in the past, to put a plastic resin in the opening to the rear of the ring stone seated on the bezel stone seat and heat the resin so that it completely fills this space behind the ring stone. The heated resin also fills any voids between the ring stone and the metal bezel stone seat due to inadvertent irregularities in the metal stone seat or in the stone, or in both. These plastic filled voids may provide some limited cushioning for the ring stone, although there is always metal-to-stone contact between the ring stone and the metal bezel stone seat. Moreover, the plastic resin is only put into the space behind the ring stone after the ring stone has been seated on the metal bezel stone seat so that, in any event, the plastic would not provide any cushioning or shock resistance for the ring stone during the stone setting operation, which is a major cause of stone breakage during ring production. Also, the plastic resin can only be used, as noted above, in rings having an "open back" construction.

In contrast to the foregoing and to prior rings, the improved ring of the present invention includes cushion means comprising a novel, removable, generally annular plastic cushion which fits within and extends completely around the bezel and which supports the ring stone so that there is no metal-to-stone contact between the stone and the metal bezel stone seat. The novel cushion provides a relatively shock resistant seat for the ring stone while the ring stone is being set in the ring during the ring production and during the time the ring is worn.

The novel cushion includes an inwardly tapered seating surface which contacts the ring stone so that when the ring stone is set on the cushion, a liquid seal is formed between the ring stone and the cushion and between the cushion and the bezel. This liquid seal prevents liquids from getting behind the stone and causing discoloration or the breakdown of a plating on a vacuum plated stone. In the preferred embodiment of the present invention, the ring stone has an inwardly tapered seat bexel cut in its lower portion. This seat bevel is cut so that it contacts the sealing surface of the cushion and so that the angle of its taper is substantially equal to the angle of the taper of the seating surface of the cushion. The usage of the seating bevel on the stone assures that the stone seats accurately on the cushion, i.e., centers accurately, so as to provide a better liquid seal between the stone and the cushion and to provide a more uniform and a continuous surface contact between the stone and the cushion, thereby reducing stress on the stone, providing a better liquid seal between the stone and cushion and improving the shock resistant characteristics of the stone mounting.

Accordingly, it is a primary object of the present invention to provide an improved ring. A related object of the present invention is to provide an improved ring of the type described wherein a novel plastic cushion is positioned in the bezel and supports the stone so as to avoid metal-to-stone contact between the bezel stone seat and the stone.

Another object of the present invention is to provide an improved ring of the type described wherein the novel plastic cushion fits within and extends completely around the bezel; and wherein the novel cushion includes an inwardly tapered seating surface which is constructed and arranged so that a liquid seal is formed between the stone and the cushion and between the cushion and the bezel when the stone rests upon the seating surface of the cushion.

A related object of the present invention is to provide an improved ring of the type described wherein cushion means is provided which may include, in addition to the aforesaid cushion, a generally annular, plastic shim member positioned between the cushion and the stone seat, with the thickness of the shim member being selected to compensate for variations in the thickness of the stone and so that the setting bevel of the stone is always in the same or a uniform position relative to the setting edge of the bezel.

Still another object of the present invention is to provide an improved ring of the type described wherein the ring stone has an inwardly tapered seat bevel cut in its lower portion, which seat bevel is arranged to contact the sealing surface on the plastic cushion; and wherein the seat bevel and the seating surface of the cushion are constructed so that the angle of the inward taper of the seat bevel is substantially equal to the angle of the inward taper of the seating surface of the cushion.

These and other objects and advantages of the present invention will become more apparent upon reference to the following specification, drawings and appended claims.

DESCRIPTION OF THE PREFERRED EMBODIMENT

Figure 1:
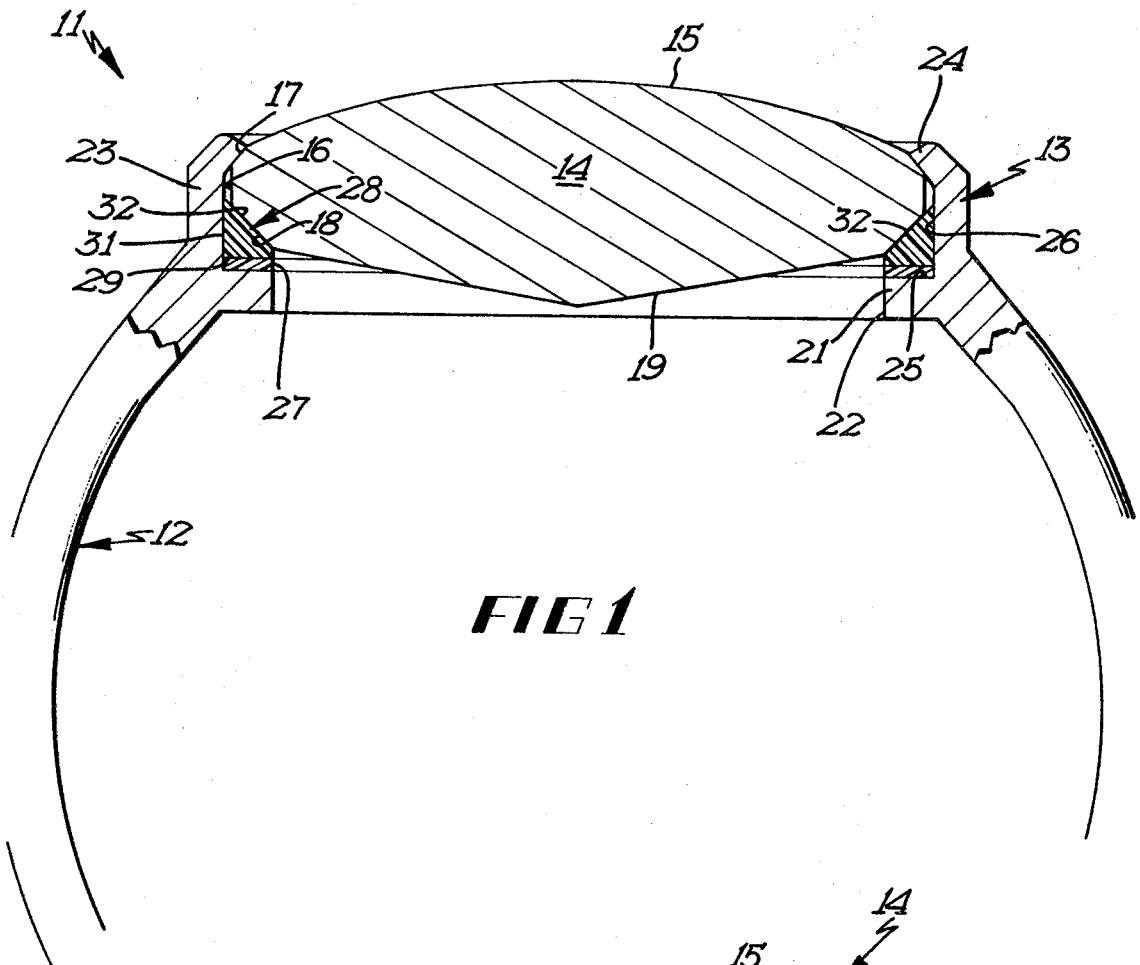
FIG. 1 is a partial, vertical cross-sectional view of an improved ring of the present invention showing the ring stone supported on a novel plastic cushion positioned in the bezel of the ring.

Referring now to FIG. 1, an improved ring of the present invention is shown generally at 11. The ring 11 comprises a shank portion 12 which is designed to fit about a person's finger and a bezel portion 13 in which a stone 14 is adapted to be mounted.

Figure 2:
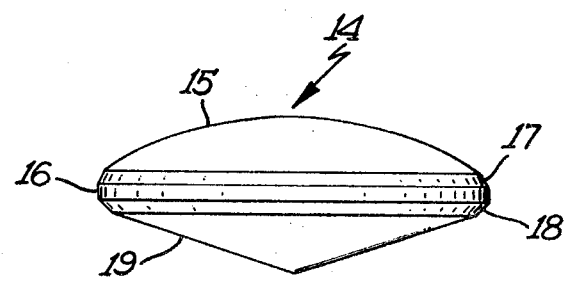
FIG. 2 is a side view of an oval stone which may be utilized in the improved ring of the present invention.
Figure 3:
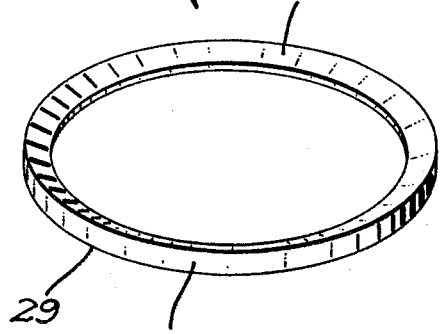
FIG. 3 is a perspective view of a novel plastic cushion which may be utilized in the improved ring of the present invention.

The stone 14, as best shown in FIG. 2, is generally oval in shape and has a buffed top or upper portion 15, as opposed to having facets cut in the upper portion. A central girdle 16 is cut about the center of the stone 14. An inwardly tapered setting bevel 17 is cut in the upper portion 15 adjacent to the girdle 16, and an inwardly tapered seat bevel 18 is cut in the lower portion 19 of the stone 14 adjacent to the girdle 16, for the reasons hereinafter explained.

The bezel portion 13 includes a stone seat 21 which has a central opening 22 formed therethrough, and a continuous side wall 23, the upper end of which terminates in a setting edge 24 which is bent over so that it contacts the setting bevel 17 of the stone 14 and thereby secures the stone 14 within the ring. Prior to the stone 14 being set in the ring bezel, the side wall 23 is straight, rather than bent as shown in FIG. 1, so that the stone 14 may be set or placed into the bezel portion. After the stone 14 has been set in the ring, the setting edge 24 is bent over the stone, as described above, so as to secure the stone within the ring.

The side wall 23 and the stone seat 21 are formed so that, in cross-section, a substantially right angle is defined between the upper surface 25 of the stone seat 21 and the inner, side surface 26 of the wall 23. A generally annular, nylon shim member 27 is positioned on the surface 25 of the stone seat 21. The member 27 is generally rectangular in cross-section, and has a width, in the radial direction, substantially equal to the width of the surface 25, i.e., the width of the stone seat 21. The member is constructed and arranged so that it abuts the side surface 26 and does not extend beyond the radially inner end of the stone seat 21, i.e., overlie the opening 22. The thickness of the member 27 used in a particular ring is determined by the thickness of the stone 14 used in the ring, the purpose of the member 27 being to assure that the stone 14 is always positioned within the bezel portion 13 at a preselected height above the stone seat 21 so that when the setting edge 24 is bent over, it will contact the setting bevel 17. In other words, the thickness of the member 27 is selected, with regard to the thickness of the stone, so that there is always a uniform relationship between the stone 14 and the setting edge 24, regardless of the thickness of a particular stone. Of course, if a particularly "thick" stone is used, the member 27 may be omitted.

A generally annular, plastic cushion 28 is also positioned in the bezel portion 13 so that the bottom surface 29 of the cushion rests on the top surface of the member 27. The side wall 31 of the cushion 28 contacts the side surface 26 of the wall 23. Like member 27, the width of the cushion 28, in a radial direction, is substantially equal to the width of the member 27 and thus to the width of the stone seat 21. The cushion 28 is made from a molded plastic resin and is relatively resilient and deformable so that the cushion is able to absorb and cushion impacts. A plastic resin which may be used is the resin identified by the trademark "Delrin Natural 500," marketed by E. I. du Pont de Nemours & Company of Wilmington, Del.

The cushion 28 has a generally triangular cross-section and has an inwardly tapered surface 32 which is constructed and arranged to contact the stone 14, and more specifically, the seat bevel 18 of the stone. The angle of the surface 32 is generally less than 50°, with respect to the vertical, and a surface having an angle of 45° has been found to work satisfactorily. The reason for limiting the angle of the surface 32 is that if the angle becomes too great, there may be problems with regard to centering the stone, particularly if the stone has facets formed on its lower portion 19.

Generally, the seat bevel 18 is cut so that it has the same angle as the surface 32. This permits a "surface to surface" contact to be formed between the stone and the cushion which assists in centering the stone with respect to the cushion, and thus with respect to the bezel portion 13, which provides a shock resistant mounting for the stone and which also provides a better liquid seal between the stone and the cushion. Moreover, when the setting edge 24 is bent into contact with the setting bevel 17 of the stone, the stone is forced downward against the cushion so that as a result, the side wall 31 of the cushion is forced against the surface 26 and the member 27 is forced against the surface 25 whereby a liquid seal is also formed between the cushion 28 and member 27 and the surfaces 26 and 25, respectively. The liquid seals are beneficial in that they prevent liquid from leaking or getting behind the stone and causing discoloration of the stone and, in some cases, a breakdown of the plating on a vacuum plated stone.

As shown in FIG. 1, the only metal contacting the stone is the setting edge 24 which, as noted above, contacts the stone along the setting bevel 17 formed in the upper portion 15 of the stone. The cushion 28 prevents any other metal-to-stone contact between the stone and the bezel portion. Since most shocks or impacts to a ring come from above or to the side, the use of the cushion 28 significantly reduces breakage of stones.

As noted above, the stone 14 has smooth surfaces, but a stone having facets cut therein may also be utilized with the improved ring of the present invention. Moreover, the stones need not have the seat bevel 18 cut therein since the resiliency of the cushion 28 is sufficient so that the cushion will still provide continuous surface contact between the cushion and the lower portion 16 of the stone.

In making an improved ring of the present invention, the member 27 and the cushion 28 are positioned, in turn, on the stone seat 21. Since the stone 14 is secured within the bezel portion 13 by the setting edge 24, no adhesive or other means need be used to secure the member 27 and cushion 28 within the bezel portion 13. The stone 14 is then set on the surface 32 of the cushion. As noted above, the centering of the stone, with respect to the cushion, is assisted by the fact that the angles of the surface 32 and the seat bevel 18 are the same. After the stone is set and centered, the setting edge 24 is bent over so that the edge contacts the stone about the setting bevel 17. The cushion provides a shock-resistant mounting for the stone not only while the ring is being worn but during the time the stone is being set during production of the ring. This is an important additional advantage, since heretofore most stone breakage which occurred during the making of the ring happened during the stone setting operation.

Therefore, in view of the foregoing, it should be apparent that the ring of the present invention provide a significant improvement over prior rings in that the use in the ring of a plastic cushion minimizes stone breakage both during production of the ring and while the ring is being worn, while additionally providing a liquid seal between the stone and the bezel.

Moreover, the principles of this invention could be used with jewelry other than rings and thus the term "ring" as used hereinbefore should not be understood to exclude other items of jewelry. Also, of course, the configuration of the cushion and other parts of the improved ring could be changed without departing from the principles of this invention. Therefore, the invention described herein may be embodied in other specific forms without departing from the spirit or essential characteristics of the invention. The present embodiment is, therefore, to be considered in all respects as illustrative and not as restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An improved ring comprising: a ring body, including a shank portion adapted to fit about a finger; the ring body also including a ring stone receiving bezel having a stone seat and a side wall portion; a ring stone having a shape and size so that it can fit within the bezel; means for absorbing shocks transmitted by said stone and for sealing against the passage of liquid between said stone and bezel, said means including a cushion means positioned in the bezel, said cushion means having a bottom surface which rests on the stone seat of the bezel, a side surface which is positioned adjacent to the side wall portion of the bezel, and a seating surface on which at least a part of the bottom portion of the stone rests and is supported and which has a shape generally conforming to the shape of said part of the bottom portion of the stone; said seating surface of the cushion means being constructed and arranged so that an annular seal is formed between said seating surface of the cushion means and said part of the bottom portion of the stone and between the side surface of the cushion means and the side wall of the bezel, which seal prevents liquid from passing between the stone and the cushion means and between the cushion means and the bezel; and setting means for securing the stone within the bezel.

2. The improved ring described in claim 1, wherein the cushion means conforms to the shape of the bezel and extends completely around the bezel; wherein the side surface of the cushion means contacts the side wall portion of the bezel; and wherein the seating surface of the cushion means is inwardly tapered at a preselected angle.

3. The improved ring described in claim 1 wherein said part of the bottom portion of the stone is an inwardly tapered seat bevel cut in the bottom portion of the stone; and wherein the angle of the seat bevel of the stone and the angle of the seating surface of the cushion means are substantially identical thereby assisting the centering of the stone with respect to the cushion means.

4. The improved ring described in claim 3 wherein the stone and the cushion means are constructed and arranged so that the only contact between the lower portion of the stone and the cushion means occurs between the inwardly tapered seat bevel of the stone and the seating surface of the cushion means.

5. The improved ring described in claim 4 wherein the angle of the seat bevel of the stone and the angle of the seating surface of the cushion means is less than 50°, with respect to the vertical.

6. The improved ring described in claim 4 wherein the cushion means conforms to the shape of the bezel and extends completely around the bezel; wherein the side surface of the cushion means contacts the side wall portion of the bezel; and wherein the seating surface of the cushion means is inwardly tapered.

7. The improved ring described in claim 6 wherein the cushion means includes a generally annular plastic member having a generally triangular vertical cross section; and a generally annular shim member positioned between the bottom surface of the annular plastic member and the stone seat of the bezel, with the thickness of the shim member being selected so as to obtain a uniform relationship between the stone and the setting means.

References Cited

UNITED STATES PATENTS

| | | | |
|---|---|---|---|
| 1,879,896 | 9/1932 | Foster | 63—26 |
| 2,666,306 | 1/1954 | Lewis | 63—26X |

FOREIGN PATENTS

| | | | |
|---|---|---|---|
| 568,998 | 1/1924 | France | 63—26 |
| 588,891 | 6/1947 | Great Britain | 63—26 |
| 338,780 | 5/1954 | Switzerland | 63—26 |

F. BARRY SHAY, Primary Examiner

U.S. Cl. X.R.

29—10; 63—26